US008459607B2

(12) United States Patent
Sasaki et al.

(10) Patent No.: US 8,459,607 B2
(45) Date of Patent: Jun. 11, 2013

(54) CONTROL DEVICE AND CONTROL METHOD FOR CONTROL VALVE

(75) Inventors: Yuji Sasaki, Wako (JP); Hideyo Uehara, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 381 days.

(21) Appl. No.: 12/867,002

(22) PCT Filed: Dec. 19, 2008

(86) PCT No.: PCT/JP2008/003868
§ 371 (c)(1),
(2), (4) Date: Aug. 10, 2010

(87) PCT Pub. No.: WO2009/107183
PCT Pub. Date: Sep. 3, 2009

(65) Prior Publication Data
US 2011/0006233 A1 Jan. 13, 2011

(30) Foreign Application Priority Data
Feb. 25, 2008 (JP) .................................. 2008-042883

(51) Int. Cl.
*F16K 31/02* (2006.01)
(52) U.S. Cl.
USPC ............. 251/129.04; 251/129.12; 123/568.24
(58) Field of Classification Search
USPC .. 123/306, 568.21, 568.23, 568.24; 29/888.4; 251/129.04, 129.12; 701/108
See application file for complete search history.

(56) References Cited

U.S. PATENT DOCUMENTS

| 4,265,163 A | 5/1981 | Arao et al. |
| 6,640,791 B2 * | 11/2003 | Itoi et al. ................... 123/568.23 |
| 7,036,486 B2 * | 5/2006 | Kamimura et al. ........... 123/399 |
| 2002/0112709 A1 | 8/2002 | Itoi et al. |

FOREIGN PATENT DOCUMENTS

| EP | 1 273 778 A1 | 1/2003 |
| EP | 1 310 660 A1 | 5/2003 |
| JP | 10-058504 A | 3/1998 |
| JP | 10-213016 A | 8/1998 |
| JP | 10-288052 A | 10/1998 |
| JP | 2000-234564 A | 8/2000 |
| JP | 2003-239768 A | 8/2003 |
| JP | 2005-315081 A | 11/2005 |
| JP | 2007-032356 A | 2/2007 |
| JP | 2007-064166 A | 3/2007 |
| JP | 2007-159336 A | 6/2007 |

\* cited by examiner

*Primary Examiner* — John K Fristoe, Jr.
*Assistant Examiner* — Mer Arnel Manahan
(74) *Attorney, Agent, or Firm* — Arent Fox LLP

(57) ABSTRACT

A control device includes an opening detector that detects the opening of a control valve driven by an electric actuator. A control element sets the target opening of the control valve, thereby to control the electric actuator in accordance with a deviation between the target opening and the detected opening. In the case where a predetermined necessary condition containing at least a condition for the absolute value of the deviation to be smaller than a predetermined value is satisfied, power to the electric actuator is interrupted to prevent the electric actuator from generating a driving force. This reduces situations where the driving force to be applied from the electric actuator to the control valve fluctuates finely to suppress the progress of the wear or deterioration of the components of the electric actuator.

6 Claims, 4 Drawing Sheets

CONTROL DEVICE AND CONTROL METHOD FOR CONTROL VALVE

CROSS-REFERENCED TO RELATED APPLICATION

This application is a National Stage entry of International PCT/JP2008/003868, filed Dec. 19, 2008, which claims priority to Japanese Patent Application No. 2008-042883, filed Feb. 19, 2008, the duty disclosure of the prior application is incorporated in its entirety by reference.

TECHNICAL FIELD

The present invention relates to a control device and a control method for a control valve driven by an electric actuator.

BACKGROUND ART

As a technique of controlling the opening of a control valve driven by an electric actuator, there is known a technique of feedback controlling the opening of the control valve to a target opening. For example, Japanese Patent Application Laid-Open No. Hei 10-288052 (hereinafter, referred to as "Patent Document 1") discloses a technique of feedback controlling the opening of an internal combustion engine throttle valve as a control valve to a target opening. This technique detects the opening of the throttle valve by using a sensor and controls electricity supply to an electric motor as an electric actuator by a control command, which is decided by a feedback control law such as the PID law from a deviation between the detected opening and the target opening of the throttle valve.

In the technique of feedback controlling the opening of the control valve, however, as shown in Patent Document 1, the deviation between the detected value and the target opening does not become constantly zero due to a disturbance or other factors and finely fluctuates in general, for example, even if the detected value of the opening of the control valve converges substantially to the target opening in a situation where the target opening of the control valve is maintained at a constant level. Moreover, the fine fluctuation of the deviation causes a fine fluctuation of a driving force applied from the electric actuator to the control valve. Therefore, there has been a problem of wear or deterioration which easily occurs in the components of the electric actuator such as, for example, the components (gear and the like) of a power transmission system between the electric motor and the control valve, a shaft bearing which supports a movable part, and other parts to which a force is applied during operation of the electric actuator.

In view of the above background, the present invention has been provided. Therefore, it is an object of the present invention to provide a control device and a control method for a control valve capable of reducing situations where the driving force to be applied from the electric actuator to the control valve fluctuates finely to suppress the progress of the wear or deterioration of the components of the electric actuator.

DISCLOSURE OF THE INVENTION

In order to achieve the above object, the present invention provides a control device for a control valve, having an opening detecting means configured to detect an opening of a control valve driven by an electric actuator, a target opening setting means configured to set a target opening of the control valve, and an actuator control means configured to control the electric actuator to eliminate a deviation between the opening detected by the opening detecting means and the target opening set by the target opening setting means with a feedback control in accordance with the deviation, the control device comprising a power supply interrupting means configured to interrupt power to the electric actuator in the case where a predetermined necessary condition containing at least a condition for the absolute value of the deviation to be smaller than a first predetermined value is satisfied.

Furthermore, the present invention provides a control method for a control valve for detecting an opening of a control valve driven by an electric actuator and for controlling the electric actuator to eliminate a deviation between the detected opening and the target opening with a feedback control in accordance with the deviation, the control method comprising the step of interrupting power to the electric actuator in the case where a predetermined necessary condition containing at least a condition for the absolute value of the deviation to be smaller than a first predetermined value is satisfied.

More specifically, in the situation where the absolute value of the deviation is extremely small, the opening of the control valve is substantially equal to the target opening, and therefore the opening of the control valve does not need to be adjusted. Therefore, according to the present invention, in the case where a predetermined necessary condition containing at least a condition for the absolute value of the deviation to be smaller than a first predetermined value is satisfied, power to the electric actuator is interrupted. Thus, in the present invention, power to the electric actuator is interrupted to prevent the electric actuator from generating a driving force for adjusting the opening of the control valve in a situation where the opening of the control valve does not need to be adjusted as described above. In this state, the power is not transmitted from the electric actuator to the control valve. This enables the suppression of the progress of the wear or deterioration of the components of the electric actuator related to the power transmission.

In the control device or the control method for the control valve according to the present invention, preferably the predetermined necessary condition further contains a condition for the absolute value of a variation of the target opening per predetermined unit time to be smaller than a second predetermined value.

According thereto, the power to the electric actuator is interrupted if the opening of the control valve is substantially equal to the target opening and further a temporal change in the target opening is extremely small, in other words, if both of the following are satisfied: the opening of the control valve is substantially equal to the target opening; and a temporal change in the target opening is extremely small. Therefore, it is possible to prevent the power to the electric actuator from being interrupted excessively frequently and to interrupt the power transmission from the electric actuator to the control valve in a more preferable situation.

Further, in the control device or the control method for the control valve according to the present invention, in the case where the control valve is biased to obtain a predetermined opening in a state where the electric actuator does not generate a driving force, the predetermined necessary condition further contains a condition for the absolute value of a deviation between the detected opening or the target opening and the predetermined opening to be smaller than a third predetermined value.

More specifically, when the control valve is biased to the predetermined opening as described above, an actual opening of the control valve is significantly different from the original target opening when the power to the electric actuator is interrupted if the target opening or the detected opening of the control valve is significantly different from the predetermined opening. The above is true even when the absolute value of the deviation is smaller than the first predetermined value, or when both the absolute value of the deviation is smaller than the first predetermined value and the absolute value of the variation of the target opening per predetermined unit time are smaller than the second predetermined value. Therefore, according to the present invention, the predetermined necessary condition further contains a condition for the absolute value of the deviation between the detected opening or the target opening and the predetermined opening to be smaller than a third predetermined value. This prevents an actual opening of the control valve from being significantly different from the target opening by the interruption of the power supply.

Further, in the control device for the control valve according to the present invention, preferably the power supply interrupting means interrupts the power to the electric actuator in the case where the predetermined necessary condition continues for a predetermined time or more. Similarly, in the control method for the control valve according to the present invention, preferably the power to the electric actuator is interrupted in the case where the predetermined necessary condition continues for a predetermined time or more.

According to the above, the power to the electric actuator is interrupted in a situation where the opening of the control valve is continuously and stably controlled to the target opening. Therefore, it is possible to effectively prevent the power to the electric actuator from being excessively interrupted and to interrupt the power transmission from the electric actuator to the control valve in a more preferable situation.

BEST MODE FOR CARRYING OUT THE INVENTION

One embodiment of the present invention will be described below with reference to FIGS. 1 to 4.

FIG. 1 shows a diagram illustrating a system configuration of an essential part of an internal combustion engine having a control valve according to this embodiment. Referring to the diagram, the internal combustion engine 1 in this embodiment includes an intake path 4 which introduces air into a cylinder 2 via an intake port opened or closed by an intake valve 3, an exhaust path 6 which discharges exhaust gas from the cylinder 2 via an exhaust port opened or closed by an exhaust valve 5, and an exhaust gas recirculation path 7 which recirculates a part of the exhaust gas from the exhaust path 6 to the intake path 4. The internal combustion engine 1 may be either of a combustion ignition type of internal combustion engine and a spark ignition type of internal combustion engine. Moreover, in FIG. 1, a mechanism (such as a fuel injection valve) for supplying fuel to the cylinder 2 is not shown.

The intake path 4 is provided with a throttle valve 8 which adjusts an intake air amount of the cylinder 2 and a swirl control valve 9 (hereinafter, referred to as "SCV 9") which appropriately generates a swirl flow in the air which flows into the cylinder 2 in an intake stroke. The throttle valve 8 is disposed on the upstream side of the junction of the exhaust gas recirculation path 7 in the intake path 4. Moreover, the SCV 9 is disposed on the downstream side of the junction of the exhaust gas recirculation path 7 and in the vicinity of the intake port of the cylinder 2.

Furthermore, the exhaust gas recirculation path 7 is provided with an exhaust gas recirculation control valve 10 (hereinafter, referred to as "EGR valve 10") which adjusts a flow rate of exhaust gas flowing in the exhaust gas recirculation path 7, namely, an exhaust gas recirculation amount. In this embodiment, the EGR valve 10 is biased to an opening for closing the exhaust gas recirculation path 7 by a biasing means such as a spring, which is not shown.

More specifically, although FIG. 1 typically shows the cylinder 2 as only one cylinder in the internal combustion engine 1, the internal combustion engine 1 may have a plurality of cylinders. In that case, the intake path 4 is composed of the main path common to all cylinders and auxiliary paths for the respective cylinders divided from the main path to the intake ports of the respective cylinders. Similarly, the exhaust path 6 is composed of the main path common to all cylinders and auxiliary paths for the respective cylinders leading from the exhaust ports of the respective cylinders into the main path. Moreover, the exhaust gas recirculation path 7 leads from the main path of the exhaust path 6 to the main path of the intake path 4. In addition, the throttle valve 8 is disposed in the main path of the intake path 4, and the SCV 9 is disposed in each of the auxiliary paths of the respective cylinders of the intake path 4.

Further, the number of intake ports and the number of exhaust ports of each cylinder 2 each do not need to be one, but each cylinder 2 may be provided with a plurality of intake ports or/and a plurality of exhaust ports. If each cylinder 2 is provided with a plurality of intake ports, there is no need to dispose the SCV 9 for each intake port of each cylinder 2, but the SCV may be disposed only in an auxiliary path leading to one intake port of each cylinder 2.

In this embodiment, the SCV 9 and the EGR valve 10 disposed in the internal combustion engine 1 as described above correspond to control valves in the present invention and are driven by electric actuators 11 and 12, respectively. In this case, the electric actuator 11 includes an electric motor 13 and a speed reducer 14 as a power transmission system composed of a plurality of gears and the like, with the SCV 9 connected to a rotor (not shown) of the electric motor 13 via the speed reducer 14. The SCV 9 is rotationally driven by a driving force applied by the electric motor 13 via the speed reducer 14, and the rotational drive changes the opening (rotation angle) of the SCV 9.

In the same manner, the electric actuator 12 includes an electric motor 15 and a speed reducer 16 as a power transmission system, with the EGR valve 10 connected to a rotor (not shown) of the electric motor 15 via the speed reducer 16. The EGR valve 10 is rotationally driven by a driving force applied by the electric motor 15 via the speed reducer 16, and the rotational drive changes the opening (rotation angle) of the EGR valve 10.

Moreover, opening sensors (opening detecting means) 17 and 18, which detect an opening θs_svc of the SCV 9 and an opening θs_egr of the EGR valve 10, are attached to the electric actuators 11 and 12, respectively.

The electric motors 13 and 15 are DC motors in this embodiment and are electrically connected to DC power supplies, which are not shown, via motor drive circuits 19 and 20, respectively. Further, the motor drive circuits 19 and 20 are each electrically connected to a control element 21 composed of an electric circuit including a CPU, a RAM, a ROM, and the like. Then, control commands input from the control element 21 to the motor drive circuits 19 and 20, respectively, control the electricity supply from the DC power supplies to armature windings (not shown) of the electric motors 13 and 15 and further control the direction and the magnitude of driving forces generated by the electric motors 13 and 15.

In this embodiment, a so-called duty control controls the driving forces generated by the electric motors 13 and 15, and the control commands input from the control element 21 to the motor drive circuits 19 and 20 each include a pulse signal having a predetermined period. Moreover, the driving force generated by the electric motor 13 and further the driving force applied to the SCV 9 change according to a duty ratio of the pulse signal input to the motor drive circuit 19 (hereinafter, referred to as "SVC driving duty D_svc"). Similarly, the driving force generated by the electric motor 15 and further the driving force applied to the EGR valve 10 change according to a duty ratio of the pulse signal input to the motor drive circuit 20 (hereinafter, referred to as "EGR driving duty D_egr").

In this case, if the SVC driving duty D_svc is set to 0[%], power to the electric motor 13 (electricity supply to the armature winding of the electric motor 13) is interrupted and the driving force applied from the electric motor 13 to the SCV 9 becomes zero. If the SVC driving duty D_svc is set to a value greater than 0[%], power is supplied to the electric motor 13 and the driving force applied from the electric motor 13 to the SCV 9 increases along with an increase in the value of the SVC driving duty D_svc. The same applies to the EGR valve driving duty D_egr.

The control commands input to the motor drive circuits 19 and 20 include command signals for specifying the driving force direction (rotor rotation direction) of the electric motors 13 and 15 in addition to the above pulse signals.

More specifically, as described above, the EGR valve 10 is biased to the opening at which the exhaust gas recirculation path 7 is closed (hereinafter, referred to as "standard opening"), and therefore in a state where the electric motor 15 does not generate a driving force, the opening of the EGR valve 10 is continuously maintained at the standard opening. On the other hand, the SCV 9 is not provided with a biasing means for biasing the SCV 9 to a specific opening, and the opening of the SCV 9 in a state where the electric motor 13 does not generate a driving force is defined by a rotation angle position of the rotor of the electric motor 13 in the above state.

The control element 21 has an EGR valve control element 22 which controls the opening of the EGR valve 10 by the operation of the electric motor 15 and an SCV control element 23 which controls the opening of the SCV 9 by the operation of the electric motor 13, as functional means achieved by control processing performed by the control element 21. The EGR valve control element 22 and the SCV control element 23 decide the control commands input to the motor drive circuits 20 and 19, respectively. Moreover, in order to perform the processing of the EGR valve control element 22 and the SCV control element 23, the control element 21 receives inputs of an opening θs_svc of the SCV 9 (hereinafter, referred to as "opening detected value θs_svc") and an opening θs_egr of the EGR valve 10 (hereinafter, referred to as "opening detected value θs_egr") detected by the opening sensors 17 and 18, respectively, and receives inputs of detected data such as the number of revolutions NE of the internal combustion engine 1 and a depressing amount AP of an accelerator pedal of a vehicle equipped with the internal combustion engine 1 from appropriate sensors not shown.

Both of the EGR valve control element 22 and the SCV control element 23 have functions as a target opening setting means, an actuator control means, and a power supply interrupting means in the present invention.

The following describes more detailed processing of the EGR valve control element 22 and the SCV control element 23 with reference to FIGS. 2(a) and 2(b), FIG. 3, and FIG. 4. FIGS. 2(a) and 2(b) are block diagrams illustrating the processing functions of the EGR valve control element 22 and of the SCV control element 23, respectively. FIG. 3 is a flowchart illustrating processing of an EGR valve driving duty decision element of the EGR valve control element 22. FIG. 4 is a flowchart illustrating processing of an SCV driving duty decision element of the SCV control element.

Referring to FIG. 2(a), according to a rough classification of processing functions, the EGR valve control element 22 includes a target EGR valve opening setting element 22a which sets a target opening θc_egr of the EGR valve 10, an EGR feedback manipulated variable calculation element 22b which calculates a feedback manipulated variable Dfb_egr, which is a manipulated variable (control input) of the electric motor 15 for converging an actual opening of the EGR valve 10 to the target opening θc_egr, by a predetermined feedback control law, and an EGR valve driving duty decision element 22c which decides the EGR valve driving duty D_egr, which is a duty ratio of a pulse signal actually input to the motor drive circuit 20. Then, the EGR valve control element 22 sequentially performs the processing of these elements 22a to 22c at predetermined arithmetic processing cycles to decide the EGR valve driving duty D_egr.

In this case, the target EGR valve opening setting element 22a sequentially receives inputs of a detected value of the number of revolutions NE of the internal combustion engine 1 and a required torque Trc_eng of the internal combustion engine 1 which is decided according to the depressing amount AP of the accelerator pedal or the like. Then, the target EGR valve opening setting element 22a sequentially sets the target opening θc_egr of the EGR valve 10 on the basis of a preset map from these input values.

Furthermore, the EGR feedback manipulated variable calculation element 22b receives inputs of the target opening θc_egr of the EGR valve 10 and the opening detected value θs_egr thereof. The EGR feedback manipulated variable calculation element 22b calculates a feedback manipulated variable Dfb_egr by a predetermined feedback control law from a deviation Δθ_egr (=θc_egr−θs_egr) between the input target opening θc_egr and opening detected value θs_egr. In this embodiment, as the feedback control law for calculating the feedback manipulated variable Dfb_egr, for example, the PID law is used. More specifically, the EGR feedback manipulated variable calculation element 22b calculates the feedback manipulated variable Dfb_egr by calculating a proportional term, an integral term, and a derivative term of the deviation Δθ_egr and adding up the values. The feedback manipulated variable Dfb_egr calculated in this manner has a meaning of a requested value of the EGR valve driving duty D_egr for converging an actual opening of the EGR valve 10 to the target opening θc_egr (for eliminating the deviation Δθ_egr).

Moreover, the EGR valve driving duty decision element 22c sequentially receives inputs of the feedback manipulated variable Dfb_egr and the target opening θc_egr of the EGR valve 10 and the opening detected value θs_egr thereof. Thereafter, the EGR valve driving duty decision element 22c performs conditional determination processing on the input target opening θc_egr and opening detected value θs_egr and decides the EGR valve driving duty D_egr according to the determination result.

The processing of the EGR valve driving duty decision element 22c is performed as shown in the flowchart of FIG. 3.

The EGR valve driving duty decision element 22c first calculates the deviation Δθ_egr between the input target opening θc_egr and opening detected value θs_egr of the EGR valve 10 (step 1) and then calculates the variation δθc_egr of the target opening θc_egr (step 2). The variation δθc_egr is, more specifically, a variation per predetermined element time of the target opening θc_egr (the rate of change in the target opening θc_egr).

Subsequently, the EGR valve driving duty decision element 22c determines whether the condition that the input target opening θc_egr is smaller than a predetermined value A3 is satisfied (step 3). In this regard, the standard opening, which is the opening of the EGR valve 10 closing the exhaust gas recirculation path 7, is assumed to be an opening of a value of "0." In addition, the predetermined value A3 is previously determined to be a positive value close to 0. Therefore, the satisfied condition of step 3 means that the target opening θc_egr is equal to or substantially equal to the standard opening (the absolute value of the deviation between the target opening θc_egr and the standard opening (=0) is an extremely small value which is smaller than the predetermined value A3). The predetermined value A3 corresponds to a third predetermined value in the present invention.

Then, if the condition of step 3 is satisfied, the EGR valve driving duty decision element 22c further determines whether the condition that the absolute value (magnitude) of the deviation Δθ_egr calculated in step 1 is smaller than a predetermined value A1 and the absolute value (magnitude) of the variation δθc_egr calculated in step 2 is smaller than a predetermined value A2 is satisfied (step 4).

Here, both of the above predetermined values A1 and A2 are previously determined to be positive values close to 0. Therefore, the satisfied condition of step 4 means that the opening detected value θs_egr of the EGR valve 10 is equal to or substantially equal to the target opening θc_egr and the variation (the rate of change) per unit time of the opening target value θc_egr is sufficiently small. The predetermined values A1 and A2 correspond to a first predetermined value and a second predetermined value in the present invention, respectively.

If the condition of step 4 is satisfied, the EGR valve driving duty decision element 22c determines whether the state where the conditions of step 3 and step 4 are satisfied has continued for a predetermined time or more (step 5).

If the determination result of step 5 is positive, the EGR valve driving duty decision element 22c sets the EGR valve driving duty D_egr input to the motor drive circuit 20 to 0[%] (step 6).

Unless one of the conditions of steps 3 to 5 is satisfied, the EGR valve driving duty decision element 22c sets the EGR valve driving duty D_egr to a value of the feedback manipulated variable Dfb_egr calculated by the EGR feedback manipulated variable calculation element 22b (step 7).

The above is the processing of the EGR valve driving duty decision element 22c. Since the opening detected value θs_egr of the EGR valve 10 is equal to or substantially equal to the target opening θc_egr of the EGR valve 10 in the state where the condition of step 4 is satisfied, it may be determined whether the opening detected value θs_egr is smaller than the predetermined value A3 in step 3.

The EGR valve control element 22 generates a pulse signal having a duty ratio of the EGR valve driving duty D_egr decided as described above by the EGR valve driving duty decision element 22c and inputs the pulse signal to the motor drive circuit 20. Thereby, the driving force applied from the electric motor 15 to the EGR valve 10 is controlled.

In this case, in a situation where one of the conditions of steps 3 to 5 is not satisfied in the processing of the EGR valve driving duty decision element 22c, the EGR valve driving duty D_egr is set to a value of the feedback manipulated variable Dfb_egr. Therefore, normally, the driving force applied from the electric motor 15 to the EGR valve 10 is sequentially and variably adjusted according to the deviation Δθ_egr between the target opening θc_egr of the EGR valve 15 and the opening detected value θs_egr thereof.

On the other hand, in a situation where all conditions of steps 3 to 5 are satisfied, the EGR valve driving duty D_egr is set to 0[%]. Therefore, in a situation where the target opening θc_egr of the EGR valve 10 is equal to or substantially equal to the standard opening constantly (continuously for a predetermined time or more) (in other words, in a situation where the exhaust gas recirculation path 7 should be closed constantly), power to the electric motor 15 is interrupted and the driving force is not applied from the electric motor 15 to the EGR valve 10 if the opening detected value θs_egr of the EGR valve 10 is equal to or substantially equal to the target opening θc_egr constantly and the rate of change in the target opening θc_egr is extremely small with the target opening θc_egr constantly maintained substantially constant. In this condition, the EGR valve 10 is biased to the standard opening by the biasing means such as a spring as described above, and therefore the opening of the EGR valve 10 is maintained at the standard opening constantly. Therefore, as a result, the opening of the EGR valve 10 is equal to or substantially equal to the target opening θc_egr constantly without the generation of the driving force by the electric motor 15. In addition, since the electric motor 15 does not generate the driving force in this state, it is possible to prevent a force which may cause fine fluctuations from being applied to the components of the electric actuator 12 (particularly, components to which the force is applied due to the generation of the driving force by the electric motor 15) such as the components (for example, a gear or a shaft bearing) of the speed reducer 16 which is interposed between the EGR valve 10 and the electric motor 15. As a result, it is possible to suppress the progress of the wear or deterioration of the components of the electric actuator 12. Moreover, the power consumption of the electric motor 15 is able to be reduced by interrupting the power to the electric motor 15.

More specifically, as for the EGR valve 10 as one control valve in this embodiment, a target opening setting means in the present invention is achieved by the processing of the target EGR valve opening setting element 22a. Moreover, an actuator control means in the present invention is achieved by the processing of the EGR feedback manipulated variable calculation element 22b and the processing of step 7 of the EGR valve driving duty decision element 22c. In addition, a power supply interrupting means in the present invention is achieved by the processing of steps 3 to 6 of the EGR valve driving duty decision element 22c. Further, the conditions in steps 3 and 4 correspond to predetermined necessary conditions in the present invention.

Subsequently, referring to FIG. 2(b), according to a rough classification of processing functions, the SCV control element 23 includes a target SCV opening setting element 23a which sets a target opening θc_scv of the SCV 9, an SCV feedback manipulated variable calculation element 23b which calculates a feedback manipulated variable Dfb_scv, which is a manipulated variable (control input) of the electric motor 13 for converging an actual opening of the SCV 9 to the target opening θc_scv, by a predetermined feedback control law, and an SCV driving duty decision element 23c which decides the SCV driving duty D_scv, which is a duty ratio of a pulse signal actually input to the motor drive circuit 19. Then, the SCV control element 23 sequentially performs the processing of these elements 23a to 23c at predetermined arithmetic processing cycles to decide the SCV driving duty D_scv.

In this case, the target SCV opening setting element 23a sequentially receives inputs of a detected value of the number of revolutions NE of the internal combustion engine 1 and a required torque Trc_eng thereof, similarly to the target EGR valve opening setting element 22a. Then, the target SCV opening setting element 23a sequentially sets the target opening θc_scv of the SCV 9 on the basis of a preset map from these input values.

Furthermore, the SCV feedback manipulated variable calculation element 23b receives inputs of the target opening θc_scv of the SCV 9 and the opening detected value θs_scv thereof. The SCV feedback manipulated variable calculation element 23b calculates a feedback manipulated variable Dfb_egr by a predetermined feedback control law (the PID law in this embodiment) from a deviation Δθ_scv (=θc_scv−θs_scv) between the input target opening θc_scv and opening detected value θs_scv, similarly to the EGR feedback manipulated variable calculation element 22b. The feedback manipulated variable Dfb_scv calculated in this manner has a meaning of a requested value of the SCV driving duty D_scv for converging an actual opening of the SCV 9 to the target opening θc_scv (for converging the deviation Δθ_scv to 0).

Moreover, the SCV driving duty decision element 23c sequentially receives inputs of the feedback manipulated variable Dfb_scv and the target opening θc_scv of the SCV 9 and the opening detected value θs_scv thereof. Thereafter, the SCV driving duty decision element 23c performs conditional determination processing on the input target opening θc_scv and opening detected value θs_scv and decides the SCV driving duty D_scv according to the determination result.

The processing of the SCV driving duty decision element 23c is performed as shown in the flowchart of FIG. 4.

The SCV driving duty decision element 23c first calculates the deviation Δθ_scv between the input target opening θc_scv and opening detected value θs_scv of the SCV 9 (step 11) and then calculates the variation δθc_scv of the target opening θc_scv (step 12). The variation δθc_scv is, more specifically, a variation per predetermined unit time of the target opening θc_scv (the rate of change in the target opening θc_scv).

Subsequently, the SCV driving duty decision element 23c determines whether the condition that the absolute value (magnitude) of the deviation Δθ_scv calculated in step 11 is smaller than a predetermined value B1 and the absolute value (magnitude) of the variation δθc_scv calculated in step 12 is smaller than a predetermined value B2 is satisfied (step 13).

Here, both of the above predetermined values B1 and B2 are previously determined to be positive values close to 0. Therefore the satisfied condition of step 13 means that the opening detected value θs_scv of the SCV 9 is equal to or substantially equal to the target opening θc_scv and the variation (the rate of change) per unit time of the opening target value θc_scv is sufficiently small. The predetermined values B1 and B2 correspond to a first predetermined value and a second predetermined value in the present invention, respectively.

If the condition of step 13 is satisfied, the SCV driving duty decision element 23c determines whether the state where the condition of step 13 is satisfied has continued for a predetermined time or more (step 14).

If the determination result of step 14 is positive, the SCV driving duty decision element 23c sets the SCV driving duty D_scv input to the motor drive circuit 19 to 0[%] (step 15).

Unless one of the conditions of steps 13 and 14 is satisfied, the SCV driving duty decision element 23c sets the SCV driving duty D_scv to a value of the feedback manipulated variable Dfb_scv calculated by the SCV feedback manipulated variable calculation element 23b (step 16).

The above is the processing of the SCV driving duty decision element 23c.

The SCV control element 23 generates a pulse signal having a duty ratio of the SCV driving duty D_scv decided as described above by the SCV driving duty decision element 23c and inputs the pulse signal to the motor drive circuit 19. Thereby, the driving force applied from the electric motor 13 to the SCV 9 is controlled.

In this case, in a situation where one of the conditions of steps 13 and 14 is not satisfied in the processing of the SCV driving duty decision element 23c, the SCV driving duty D_scv is set to a value of the feedback manipulated variable Dfb_scv. Therefore, normally, the driving force applied from the electric motor 13 to the SCV 9 is sequentially and variably adjusted according to the deviation Δθ_scv between the target opening θc_scv and the opening detected value θs_scv of the SCV 9.

On the other hand, in a situation where all conditions of steps 13 and 14 are satisfied, the SCV driving duty D_scv is set to 0[%]. Therefore, if the opening detected value θs_scv of the SCV 9 is equal to or substantially equal to the target opening θc_scv constantly and the rate of change in the target opening θc_scv is extremely small with the target opening θc_scv constantly maintained substantially constant, the electricity supply to the armature winding of the electric motor 13 is interrupted and the driving force is not applied from the electric motor 13 to the SCV 9. In this condition, the opening of the SCV 9 is maintained at the current opening, in other words, an opening equal to or substantially equal to the target opening θc_scv. Therefore, as a result, the opening of the SCV 9 is equal to or substantially equal to the target opening θc_scv constantly without the generation of the driving force by the electric motor 13. Moreover, since the electric motor 13 does not generate the driving force in this state, it is possible to prevent a force which may cause fine fluctuations from being applied to the components of the electric actuator 11 (particularly, components to which the force is applied due to the generation of the driving force by the electric motor 13) such as the components (for example, a gear or a shaft bearing) of the speed reducer 14 which is interposed between the SCV 9 and the electric motor 13. As a result, it is possible to suppress the progress of the wear or deterioration of the components of the electric actuator 11. Moreover, the power consumption of the electric motor 13 is able to be reduced by interrupting the power to the electric motor 13.

More specifically, as for the SCV 9 as one control valve in this embodiment, a target opening setting means in the present invention is achieved by the processing of the target SCV opening setting element 23a. Moreover, an actuator control means in the present invention is achieved by the processing of the SCV feedback manipulated variable calculation element 23b and the processing of step 16 of the SCV driving duty decision element 23c. In addition, a power supply interrupting means in the present invention is achieved by the processing of steps 13 to 15 of the SCV driving duty decision element 23c. Further, the condition in step 13 corresponds to a predetermined necessary condition in the present invention.

Although a biasing means which biases the SCV 9 is not provided in the embodiment described above, the SCV 9 may be biased to a predetermined opening by a biasing means such as a spring. In this case, it is determined whether the absolute value of a deviation between the target opening θc_scv or the opening detected value θs_scv of the SCV 9 and the predetermined opening is smaller than a predetermined value (a positive value close to 0), for example, between step 12 and step 13 of FIG. 4. If the determination result thereof is positive, the processing of step 13 is performed. If the determination result is negative, the processing of step 16 is performed.

In addition, although the above embodiment has been described on the assumption that the present invention is applied to both of the SCV 9 and the EGR valve 10 as control valves for purposes of example, the present invention may be applied to only one of the SCV 9 and the EGR valve 10. Moreover, the intended control valves for the present invention are not limited to the SCV 9 and the EGR valve 10, but the present invention may be applied to, for example, the throttle valve 8. As an alternative, the present invention may be applied to a control valve for a fluidic circuit of a device other than the internal combustion engine. Moreover, although the embodiment has been described on the assumption that the electric actuator includes the electric motor and the speed reducer (power transmission system) for purposes of example, the present invention is applicable, for example, even in the case where the control valve is directly connected to the rotor of the electric motor or in the case where an electromagnetic solenoid drives the control valve. Also in these cases, the present invention is able to suppress the progress of the wear or deterioration of the shaft bearing, which supports the movable part of the electric actuator, and the like when the power to the electric actuator is interrupted.

In addition, in this embodiment, it is possible to omit the determination processing of step 5 on the control of the EGR valve 10 or to omit the conditional determination of whether $|\delta\theta c\_egr|<A2$ is satisfied in the determination processing of step 4. Similarly, it is possible to omit the determination processing of step 14 on the control of the SCV 9 or to omit the conditional determination of whether $|\delta\theta c\_scv|<B2$ is satisfied in the determination processing of step 13.

Figure 1:
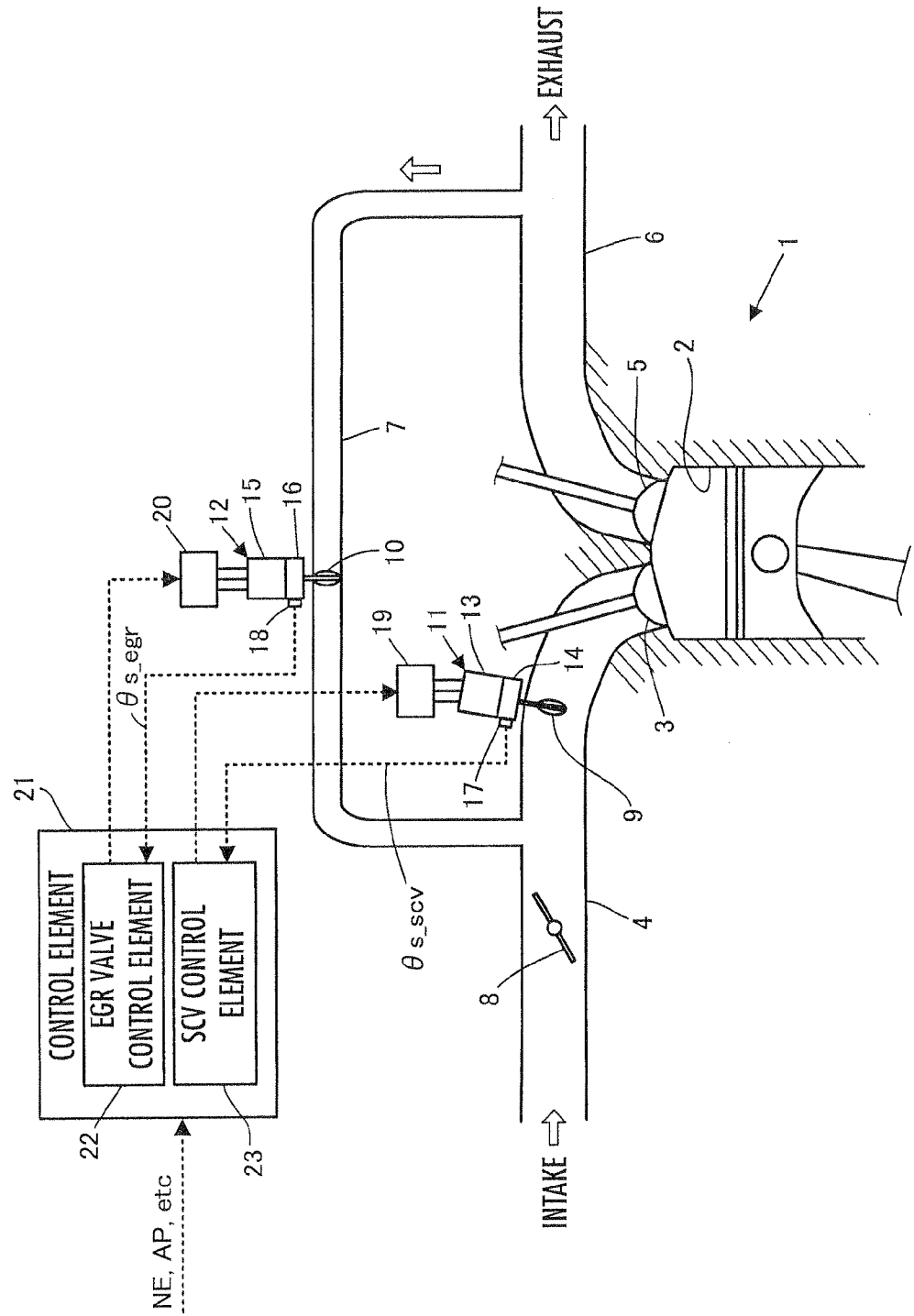
FIG. 1 is a diagram illustrating a system configuration of an essential part of an internal combustion engine having a control valve according to an embodiment of the present invention.
Figure 2A:
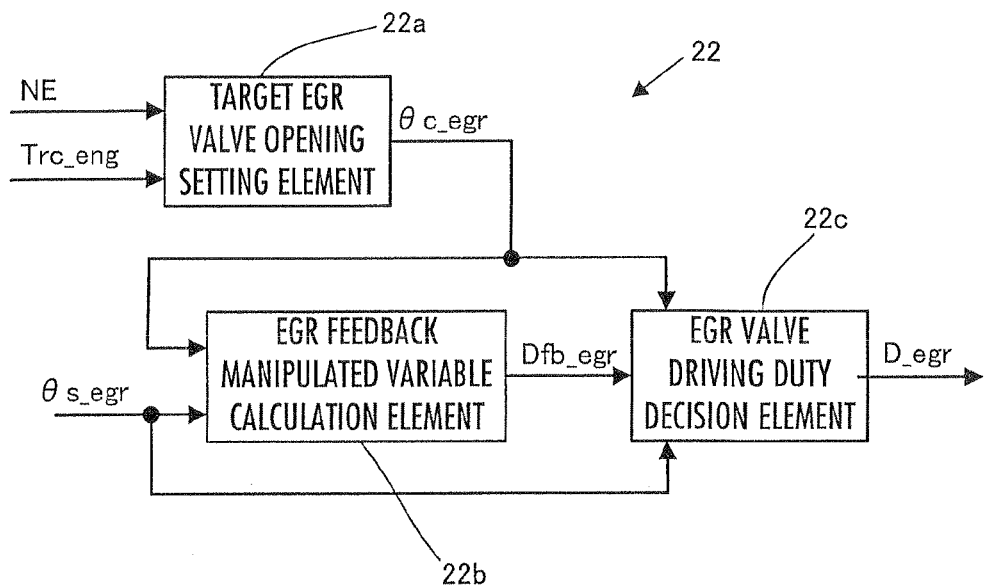
FIGS. 2(*a*) and 2(*b*) are block diagrams illustrating the processing functions of an EGR valve control element and an SCV control element, respectively, of a control element provided in the system shown in FIG. 1.
Figure 2B:
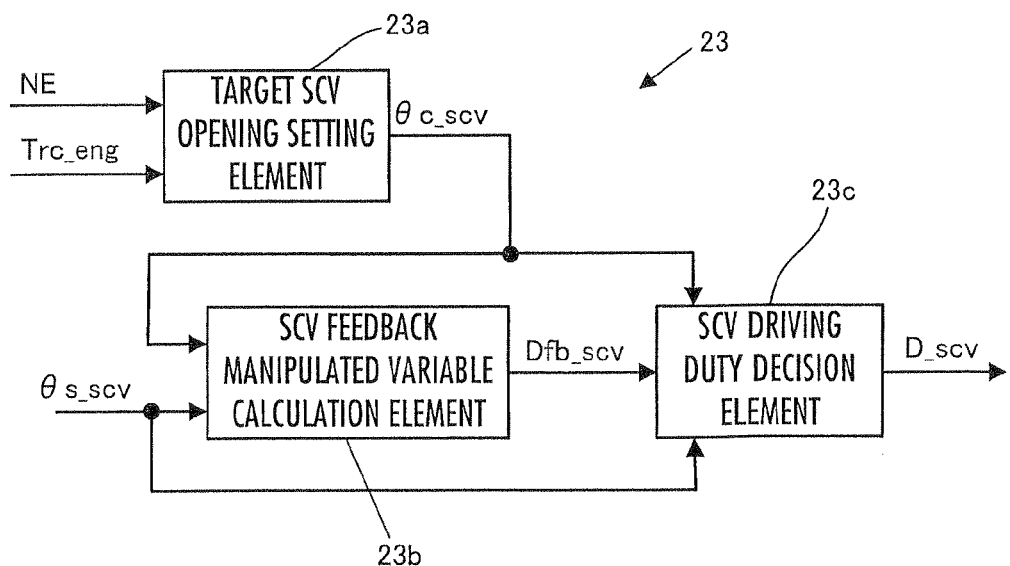
Figure 3:
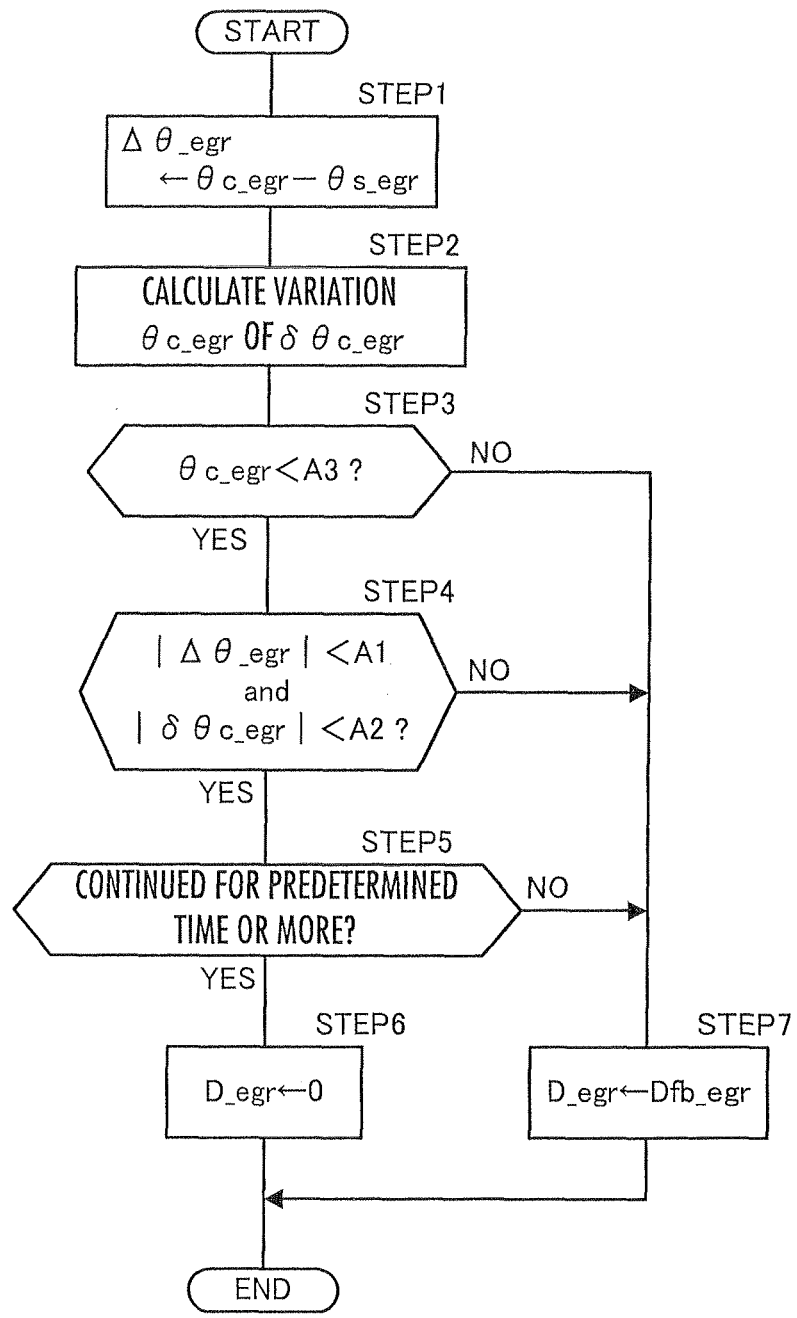
FIG. 3 is a flowchart illustrating processing of an EGR valve driving duty decision element of the EGR valve control element shown in FIG. 2(*a*).
Figure 4:
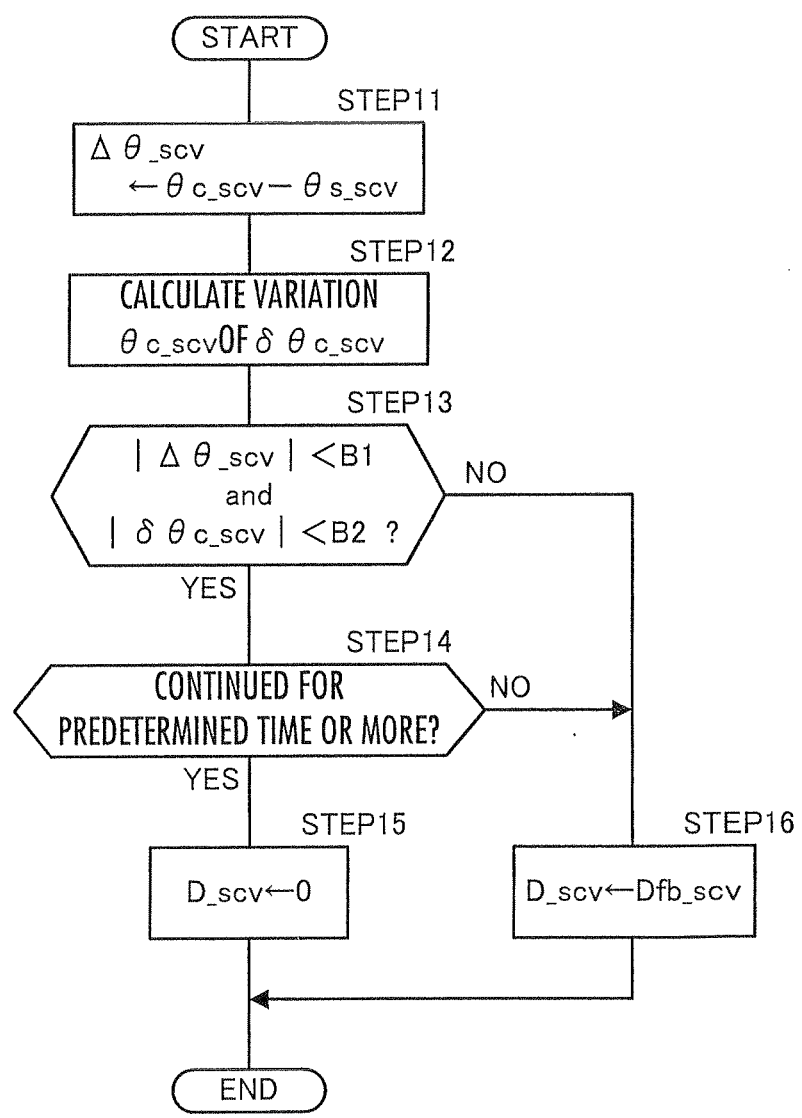
FIG. 4 is a flowchart illustrating processing of an SCV driving duty decision element of the SCV control element shown in FIG. 2(*b*).

What is claimed is:

1. A control device for a control valve, having
   an opening detecting means configured to detect an opening of a control valve driven by an electric actuator,
   a target opening setting means configured to set a target opening of the control valve, and
   an actuator control means configured to control the electric actuator to eliminate a deviation between the opening detected by the opening detecting means and the target opening set by the target opening setting means with a feedback control in accordance with the deviation,
   the control device comprising a power supply interrupting means configured to interrupt power supply to the electric actuator in the case where a predetermined necessary condition containing at least a condition for the absolute value of the deviation to be smaller than a first predetermined value is satisfied;
   wherein the control valve is biased to obtain a predetermined opening in a state where the electric actuator does not generate a driving force; and
   wherein the predetermined necessary condition further contains a condition for the absolute value of a deviation between the detected opening or the target opening and the predetermined opening to be smaller than a third predetermined value.

2. The control device for the control valve according to claim 1, wherein the predetermined necessary condition further contains a condition for the absolute value of a variation of the target opening per predetermined unit time to be smaller than a second predetermined value.

3. The control device for the control valve according to claim 1, wherein the power supply interrupting means interrupts the power supply to the electric actuator in the case where the predetermined necessary condition continues for a predetermined time or more is satisfied.

4. A control method for a control valve for detecting an opening of a control valve driven by an electric actuator and for controlling the electric actuator to eliminate a deviation between the detected opening and the target opening with a feedback control in accordance with the deviation, the control method comprising the step of
   interrupting power supply to the electric actuator in the case where a predetermined necessary condition containing at least a condition for the absolute value of the deviation to be smaller than a first predetermined value is satisfied;
   wherein the control valve is biased to obtain a predetermined opening in a state where the electric actuator does not generate a driving force; and
   wherein the predetermined necessary condition further contains a condition for the absolute value of a deviation between the detected opening or the target opening and the predetermined opening to be smaller than a third predetermined value.

5. The control method for the control valve according to claim 4, wherein the predetermined necessary condition further contains a condition for the absolute value of a variation of the target opening per predetermined unit time to be smaller than a second predetermined value.

6. The control method for the control valve according to claim 4, wherein the power supply to the electric actuator is interrupted in the case where the predetermined necessary condition continues for a predetermined time or more is satisfied.

\* \* \* \* \*